UNITED STATES PATENT OFFICE 2,321,114

TREATMENT OF RUBBER GOODS

Ralph Francis Tefft, Rochelle Park, N. J., assignor, by mesne assignments, to Allied Chemical & Dye Corporation, a corporation of New York No Drawing. Application June 27, 1940, Serial No. 342,688

3 Claims. (Cl. 260—714)

This invention relates to the disintegration of rubber and particularly to reclamation of textile materials from rubber-containing textiles.

Modern uses of rubber in textile combinations require a form of rubber resistent to dry-cleaning solvents. This type of rubber is resistant to the commonly used rubber solvents and hence cannot be separated from textiles by conventional solvent extraction processes. Such processes as are capable of removing the rubber are unsuitable for application to many types of textiles because the textiles are destroyed or at least seriously damaged by the severity of the treatments.

The present invention is particularly concerned with the removal of solvent-resistant rubber from textiles without serious injury to the textile fibers or filaments.

The invention finds particular application in reclaiming textiles from rubber-textile mixtures containing textile materials such as wool, silk, and the like, which are incapable of undergoing drastic treatment for removal of rubber.

In accordance with the present invention a mixed textile of rubber and wool, silk, cotton, rayon, or the like is digested with a "rubber solvent" containing sulfur and a vulcanization accelerator. The digestion may be conducted at ordinary or elevated pressure. The digestion period will vary with the accelerator employed, being shorter for accelerators producing rapid reversion and longer for accelerators causing slower reversion of the rubber. By such treatment I have found that the rubber may be extracted from the textile mixture leaving the rubber-free textile substantially uninjured.

The term "rubber-solvent" is used herein in its usual sense as designating a liquid which is capable of dissolving ordinary rubber.

In its preferred aspects the invention involves treatment of a rubber-textile mixture at an elevated temperature, e. g. between 120° and 160° C. using a substantially anhydrous rubber-solvent, sulfur, and a vulcanization accelerator. Accelerators of the so-called "reverting type" have been found to be particularly effective for the purposes of the invention.

The high temperatures specified accelerate the removal of the rubber from the textile. However, in the presence of water, treatement at such temperatures would be injurious to wool and it is important when such temperatures are employed in treating wool, to conduct the process in the absence of water.

Sufficient solvent should be used to provide thorough saturation of the fabric and in addition to provide for its complete immersion in a definite liquid phase. Normally the amount of sulfur added should be sufficient to provide a total proportion of sulfur (including sulfur originally present in the rubber) of at least 1½% of the weight of the rubber. The amount of accelerator added is preferably at least ½% by weight of the rubber.

Suitable solvents for the purposes of the present invention are the coal-tar hydrocarbon solvents, for example, benzol, zylol, and naphtha; the petroleum hydrocarbon solvents, for example the petroleum naphthas; chlorinated hydrocarbons; and the terpenes, for example turpentine.

Examples of accelerators which may be employed are piperidinium pentamethylene dithiocarbamate, hexamethylene tetramine, diphenylguanidine, other substituted dithiocarbamates, and accelerators of the aldehyde-amine type.

In dealing with sensitive fabrics, such as woolens, care should be taken to avoid contact of the fabric with hot surfaces and in any event it is usually desirable to agitate the mixture either by boiling or by mechanical agitation in order to assure maximum effectiveness and a minimum digestion period.

In order to assure maximum use of the treating solution and maximum removal of rubber from the fabric, a generally countercurrent operation may be employed, either batchwise or continuous, in which the fabric is first treated with used solution approaching exhaustion and is finally treated with fresh solution to remove the last traces of rubber.

Solvent may be recovered from extracted rubber by simple distillation or by vacuum distillation.

The following example illustrates the practical application of the invention.

*Example*

40 parts by weight of wool scrap, produced in the manufacture of bathing-suits and containing rubber-cored yarn, are immersed in about 350 parts by weight of anhydrous commercial xylol containing by weight about 0.9% of sulfur and about 0.3% of piperidinium pentamethylene dithiocarbamate. The mixture is refluxed at atmospheric pressure until the rubber is completely removed from the fabric. Normally not more than about twenty hours are required.

This treatment converts the rubber from the solid thread-like condition, in which it is present in the yarn, to a dissolved or suspended form.

Any suspended particles are exceedingly minute and have no noticeable tendency to adhere to the fabric.

After the digestion the fabric is separated from the rubber-containing solvent by any convenient mechanical separation method, for example by centrifuging or by filtering through a coarse filter or sieve. The separated fabric may be washed with additional solvent or with an aqueous detergent, for instance soap and water, to remove any adhering foreign matter. Practically complete removal of rubber from the fabric is thus obtained. Upon drying, the fabric is recovered in substantially uninjured form ready for further processing.

When the above treatment was conducted on the same type of material omitting either the sulfur or the dithiocarbamate practically no rubber was removed from the fabric.

I claim:

1. The method of recovering textile material from a mixture of the textile material with solvent-resistant rubber, which comprises digesting the mixture at a temperature between 120° and 160° C. with sulfur, a reverting type vulcanization accelerator, and sufficient rubber-solvent to dissolve the rubber in the presence of the sulfur and vulcanization accelerator, continuing the digestion until the rubber is dissolved in said solvent, and thereupon mechanically separating the textile material from the resulting solution.

2. The method of recovering wool from a mixture of the wool with solvent-resistant rubber, which comprises digesting the mixture at a temperature between 120° and 160° C. with sulfur, a reverting type vulcanization accelerator, and sufficient substantially anhydrous rubber-solvent to dissolve the rubber in the presence of the sulfur and vulcanization accelerator, continuing the digestion until the rubber is dissolved in said solvent, and thereupon mechanically separating the wool from the resulting solution.

3. The method of recovering wool from a mixture of the wool with solvent-resistant rubber, which comprises digesting the mixture at a temperature between 120° and 160° C. with sulfur, piperidinium pentamethylene dithiocarbamate, and sufficient substantially anhydrous aromatic hydrocarbon rubber-solvent to dissolve the rubber in the presence of the sulfur and vulcanization accelerator, continuing the digestion until the rubber is dissolved in said solvent, and thereupon mechanically separating the wool from the resulting solution.

RALPH FRANCIS TEFFT.